Aug. 27, 1963 A. K. FULLER 3,101,721
TRAP DOOR FOR CONCAVE CLEANING OF COMBINES
Filed March 6, 1961 2 Sheets-Sheet 1

INVENTOR.
ARNOLD K. FULLER
BY
Fishburn and Gold
ATTORNEYS

Aug. 27, 1963    A. K. FULLER    3,101,721
TRAP DOOR FOR CONCAVE CLEANING OF COMBINES
Filed March 6, 1961    2 Sheets-Sheet 2

INVENTOR.
ARNOLD K. FULLER
BY
Fishburn and Gold
ATTORNEYS

United States Patent Office 3,101,721
Patented Aug. 27, 1963

3,101,721
TRAP DOOR FOR CONCAVE CLEANING
OF COMBINES
Arnold K. Fuller, R.R. 1, Moscow, Kans.
Filed Mar. 6, 1961, Ser. No. 93,496
4 Claims. (Cl. 130—27)

This invention relates to harvesting machines, and more particularly to combine harvesters having a threshing cylinder coacting with a plurality of concave bars to remove the seed from the heads of a grain crop or the like.

There is usually less than 1½ inches of clearance between the concave bars and the threshing cylinder of many modern combine harvesting machines. Since the concave bars are usually spaced about a significant portion of the cylinder periphery on a fixed housing or bottom wall as, for example, in the Gleaner Baldwin combines, the concave bars are often practically inaccessible. When a crop is cut which tends to clog the concave bars, such as moist crops, the cleaning of the cylinder housing often requires as much as two hours of down time per working day.

The principal objects of the present invention are: to provide a cleaning trap door adjacent the threshing cylinder and supporting several of the concave bars, which door will swing away from the cylinder and expose the clogged concave bars for rapid cleaning thereof; to provide such a cleaning door construction which is entirely grain-tight so as not to permit the loss of grain through seams or the like; to provide such a construction which will not result in a loss of rigidity in either the combine frame or the concave bar supporting structure; to provide such a trap door construction which will not interfere with the operation of safety doors adapted to hinge open to drop stones, rocks or other hard foreign materials to the ground to prevent damaging the threshing cylinder thereby; to provide a concave cleaning trap door which is easily adapted to existing combine structures, easily operated, low in cost and highly satisfactory for the purpose intended.

Other objects and advantages of this invention will become apparent from the following description taken in connection with the accompanying drawings, wherein are set forth by way of illustration and example certain embodiments of this invention.

Figure 1:
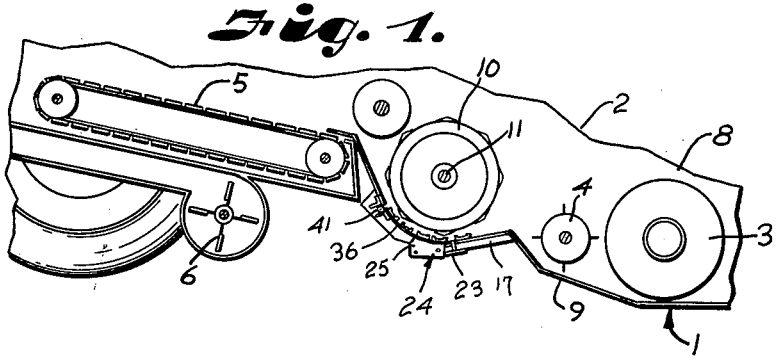
FIG. 1 is a fragmentary sectional view taken longitudinally through a combine harvester showing the relationship of the concave cleaning trap door to the various parts of the combine.

Referring to the drawings in more detail:

The reference numeral 1 indicates generally a threshing machine having a mobile frame 2, a feed auger 3, beater 4, conveyor 5, and fan 6. The machine 1 includes side walls 7 and 8 and a bottom wall 9. A threshing cylinder 10 is rotatably supported on a shaft 11 between the side walls 7 and 8 and spaced above the bottom wall 9.

A plurality of circumferentially spaced concave bars 12 to 16 inclusive are secured to the upper side of the bottom wall 9 facing the cylinder 10 and adapted to coact therewith for threshing the heads of a grain crop or the like inserted therebetween. The concave bars 12 to 16 inclusive are normally positioned adjacent to and longitudinally of the threshing cylinder 10 as shown in FIG. 2.

In the illustrated structure, a safety door 17 forms a portion of the bottom wall 9 and exhibits a front edge 18 and a rear lip or edge 19. The front edge 18 is hingedly secured by means of a transversely positioned piano type hinge 20 to a portion 21 of the bottom wall 9 located forwardly of the cylinder 10. The safety door 17 has secured thereto adjacent the rear edge 19 and by means of a suitable bolt 22 a latch dog 23 adapted to engage with a latch mechanism 24 described immediately hereinafter.

Figure 3:
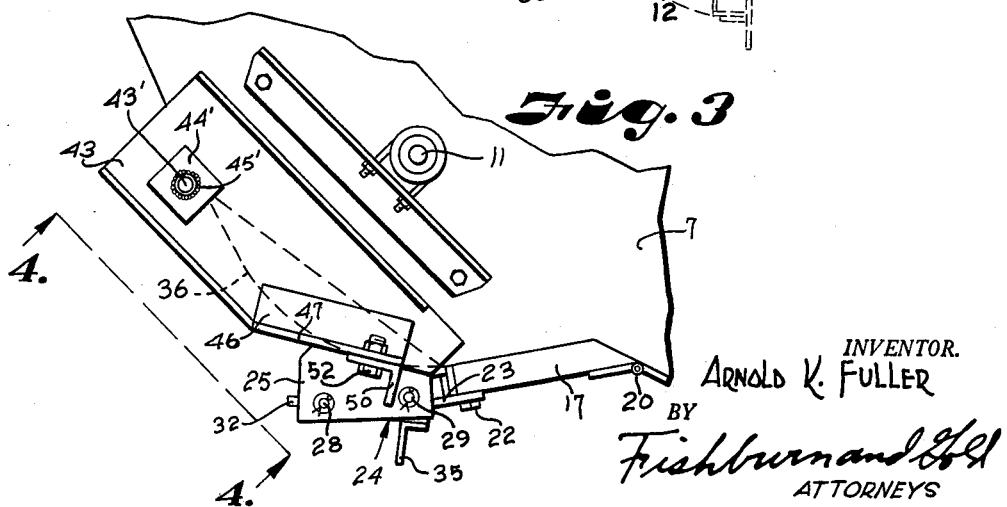
FIG. 3 is an enlarged fragmentary view of one side of the combine showing a strengthening channel member and cleaning door locking angle member in mating relation.
Figure 4:
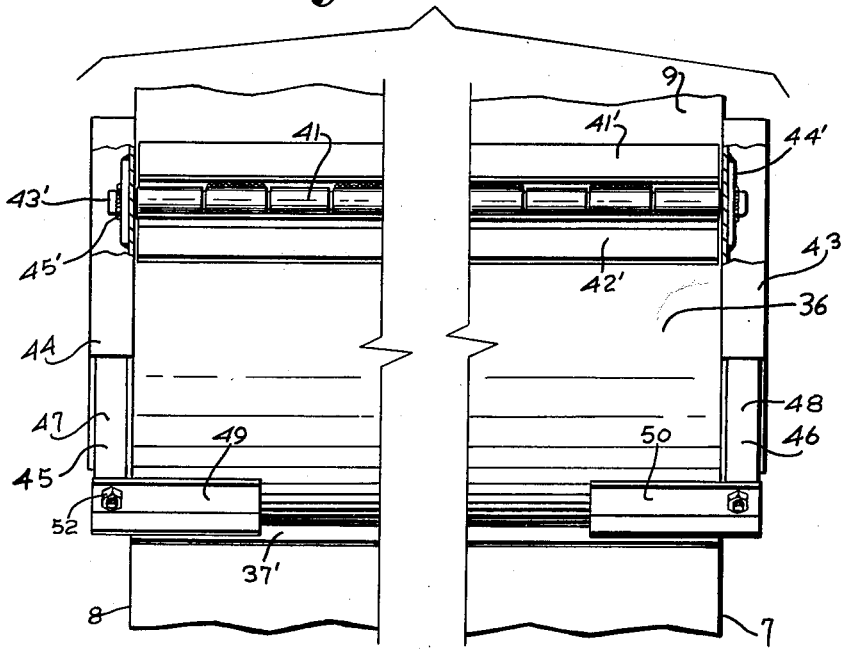
FIG. 4 is a fragmentary plan view taken on the lines 4—4, FIG. 3, showing details of the cleaning door hinge structure and locking angle.

The latch mechanism 24 comprises side brackets 25 preferably welded to the under side of the bottom wall 9 and pivotally supporting a sleeve 26 and a latch dog receiver 27 respectively by means of transverse shafts 28 and 29 (FIG. 3). A yoke 30 exhibits a shoulder 31 and a rod portion 32 extending rearwardly therefrom and slidable longitudinally in the sleeve 26. A helical compression spring 33 is sleeved over the rod portion 32 and the ends of said spring urge respectively against the sleeve 26 and the shoulder 31 to urge the yoke 30 forwardly with respect to the side brackets 25. The latch dog receiver 27 carries a transverse pin 34 extending laterally outwardly therefrom and loosely engaging in the yoke 30. A handle 35 is provided to manually operate the latch mechanism 24, if desired, in a manner which will become apparent hereinafter.

Figure 2:
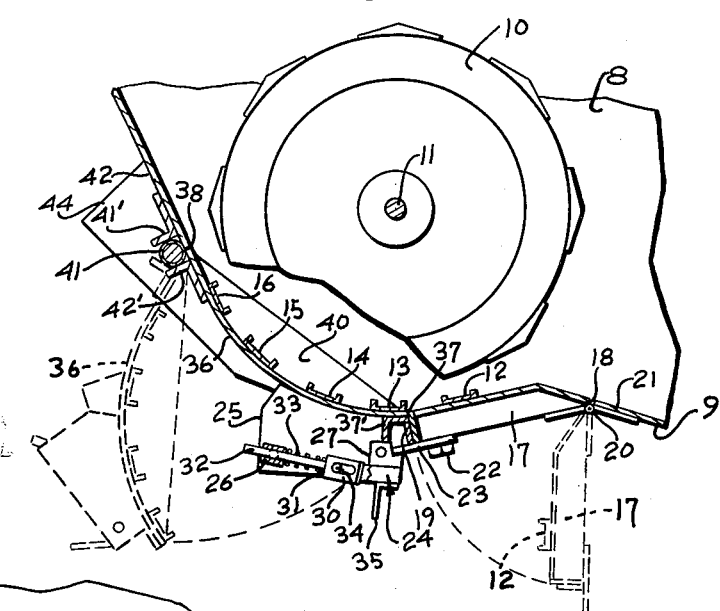
FIG. 2 is a fragmentary sectional view of the harvester on a comparatively large scale showing the threshing cylinder and the cleaning and safety doors, said doors being shown by broken lines in their opened positions.

It is evident that when the yoke 30 is below an imaginary line drawn between the shafts 28 and 29, the spring 33 will urge the latch dog receiver 27 in a counter-clockwise direction as seen in FIG. 2, forcing the latch dog 23 upwardly and maintaining the safety door 17 in a closed position. When a stone or rock or other hard material is accidentally picked up by the threshing machine and introduced between the threshing cylinder 10 and the safety door 17, the pressure caused thereby will urge the latch dog 23 downwardly and the latch dog receiver 27 in a clockwise direction until the yoke 30 is above said imaginary line (over dead center). The latch mechanism 24 will then release and permit the safety door 17 to swing open, causing the offending material to be dropped to the ground. The safety door 17 can then be manually closed and locked into position by pulling the handle 35 so as to rotate the latch dog receiver 27 counter-clockwise until the yoke 30 is again over dead center.

Figure 5:
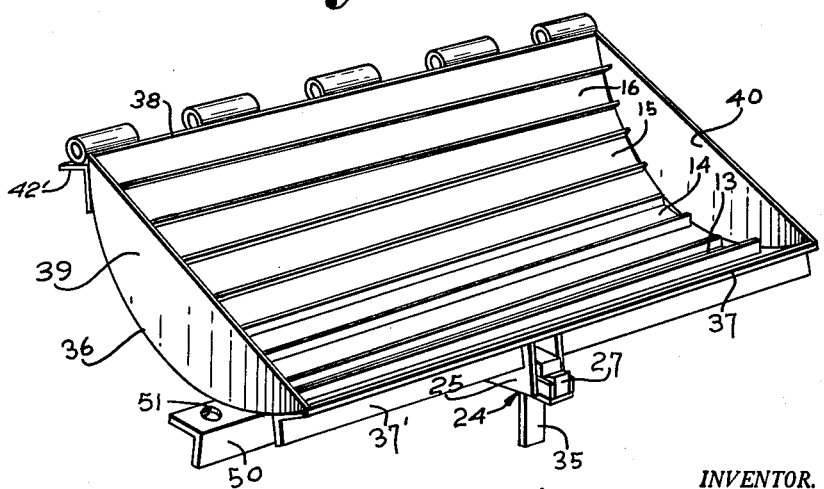
FIG. 5 is a perspective view of the cleaning trap door showing the hollow cylindrical segment shape thereof.

A concave cleaning trap door 36 forms a portion of the bottom wall 9 adjacent the safety door 17 and is of concave cross-sectional shape, as best seen in FIG. 2. The cleaning door 36 exhibits a front edge 37 adjacent the rear edge 19 of the safety door 17 and a rear edge 38 located rearwardly of the threshing cylinder 10. An angle 37' is secured to the door 36 adjacent and below the front edge 37 and extends parallel thereto across the entire width of the door 36 except for the portion of one leg occupied by the latch mechanism 24, FIG. 5. The angle 37' adds rigidity to the front edge 37 and provides a stop for the rear edge 19 of the safety door 17. The cleaning door 36 is also comprised of integral planar upwardly extending end portions or plates 39 and 40 which cause the cleaning door 36 to appear as a substantially hollow cylindrical segment with closed ends to prevent grain leakage therefrom, FIG. 5. The cleaning door 36 supports the concave bars 13 to 16 inclusive, the concave bar 12 being supported by the safety door 17.

The rear edge 38 of the cleaning door 36 is hingedly secured by means of a transversely extending piano type hinge 41 to a rear portion 42 of the bottom wall 9 located rearwardly of the cylinder 10. The hinge 41 permits the cleaning door 36 to be pivotally swung downwardly and rearwardly of the cylinder 10 to permit the concave bars 13 to 16 inclusive to be easily exposed for cleaning. Transversely extending angles 41' and 42' are secured to the hinge 41 and respectively to the rear portion 42 and the cleaning door 36 to add rigidity to the cleaning door 36 and adjacent structure.

The latch mechanism 24 described above is secured adjacent the front edge 37 of the cleaning door 36 and, although the cleaning door 36 is pivotable away from the safety door 17 and carries the latch mechanism 24 therewith, during operation of the combine when the doors 17 and 36 are closed, the latch mechanism 24 operates as described above without interference from the cleaning door or related parts.

Channel members 43 and 44 are respectively secured to the side walls 7 and 8 by suitable means, for example, by welding, and are positioned relative to the cleaning door 36 so that the plates 39 and 40 overlap and engage the channel members 43 and 44 when the door 36 is closed to provide a grain-tight structure, FIG. 3. The channel members 43 and 44 add rigidity to the frame 2 and help support the cleaning door 36 so as to prevent distortion which might result in the jamming of moving parts or the opening of seams which may produce the loss of grain. A hinge shaft 43' is received in the hinge 41 and extends through the channel members 43 and 44. Plates 44' respectively welded to the channel members 43 and 44 also receive the shaft 43' and provide additional rigidity to the hinge structure. The shaft 43' is suitably secured in the hinge 41 preferably by welding to the plates 44' at 45' whereby grain cannot leak between the shaft 43' and plate 44'. Angle members 45 and 46 are respectively secured to the channel members 43 and 44, for example by welding, and provide legs 47 and 48 which extend horizontally outwardly past the side walls 7 and 8. Locking angle members 49 and 50 are secured to the bottom of the cleaning door 36 and respectively extend horizontally outwardly past the plates 39 and 40. One leg of each of the angle members 49 and 50 is adapted to mate respectively with the legs 47 and 48 of the angle members 45 and 46 to keep the cleaning door from swinging up against the cylinder 10. Suitable holes or openings 51 are provided in the mating angle members through which bolts 52 may be inserted and engaged with suitable nuts to rigidly retain the cleaning door 36 in a closed position and yet provide simple means for opening same when concave cleaning is necessary.

Although the cleaning door 36 is illustrated and described in conjunction with the safety door 17, the cleaning door 36 will perform its intended function on combines not provided with such safety doors.

It is apparent that I have provided apparatus for exposing the concave bars of a combine harvester for quick and efficient cleaning without interfering with safety door operation and without a loss of rigidity in the structure of the combine and which provides a concave bar mounting which is absolutely grain-tight.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a combine harvester having a mobile frame including side walls and a bottom wall and a threshing cylinder rotatably supported between said side walls and above said bottom wall and a plurality of circumferentially spaced concave bars secured to the upper side of said bottom wall facing said cylinder and normally positioned adjacent to and longitudinally of said cylinder, the improvement comprising, a cleaning door forming a portion of said bottom wall, said cleaning door being of concave shape and having a front edge and a rear edge and integral planar upwardly extending end portions, said cleaning door forming a substantially hollow cylindrical segment container with closed ends for retaining grain therein, said cleaning door supporting a plurality of said concave bars and the rear edge thereof being hingedly secured to a portion of said bottom wall rearwardly of said cylinder for pivotal movement of said cleaning door downwardly and rearwardly of said cylinder, angle members secured to the under side of said cleaning door and having portions extending laterally outwardly of said end portions, a channel member secured to each of said side walls adjacent said cylinder and having web portions extending downwardly in engaging and overlapping relation to said end portions, each of said channel members having an outwardly extending leg engaging an outwardly extending portion of said angle members when said cleaning door is in closed position, and releasable retaining members for securing outwardly extending portions of said angle members to said channel member legs for retaining said cleaning door in closed position whereby said cleaning door may be pivoted upon release of said retaining member for exposing said concave bars for cleaning.

2. In a combine harvester having a mobile frame including side walls and a bottom wall and a threshing cylinder rotatably supported between said side walls and above said bottom wall and a plurality of circumferentially spaced concave bars secured to the upper side of said bottom wall facing said cylinder and normally positioned adjacent to and longitudinally of said cylinder, the improvement comprising, a safety door and a cleaning door forming portions of said bottom wall, said safety door having a front edge and a rear edge, said safety door front edge being hingedly secured to said frame, said safety door rear edge having a latch member secured thereon, said cleaning door being of concave shape, said cleaning door forming a container for retaining grain therein, said cleaning door supporting a plurality of said concave bars and being flexibly secured to said frame for movement away from said cylinder, said cleaning door having a latch member thereon adapted for engagement with said safety door latch member, securing members secured to said cleaning door, securing members secured to said frame and adapted for mating with said cleaning door securing members when said cleaning door is in closed position, and releasable retaining members for clamping said cleaning door securing members and frame securing members together for retaining said cleaning door in close position whereby said cleaning door may be easily opened for exposing concave bars for cleaning.

3. In a combine harvester having a mobile frame including side walls and a bottom wall and a threshing cylinder rotatably supported between said side walls and above said bottom wall and a plurality of circumferentially spaced concave bars secured to the upper side of said bottom wall facing said cylinder and normally positioned adjacent to and longitudinally of said cylinder, the improvement comprising, a safety door and a cleaning door forming portions of said bottom wall, said safety door having a front edge and a rear edge, said safety door front edge being hingedly secured to a portion of said bottom wall forwardly of said cylinder for pivotal movement downwardly and forwardly of said cylinder, said safety door rear edge having a latch dog secured thereon, said cleaning door being of concave shape and having a front edge and a rear edge and integral planar upwardly extending end portions, said cleaning door forming a substantially hollow cylindrical segment container with closed ends for retaining grain therein, said cleaning door supporting a majority of said concave bars and the rear edge thereof being hingedly secured to a portion of said bottom wall rearwardly of said cylinder for pivotal movement downwardly and rearwardly of said cylinder, said cleaning door front edge having a pressure-releasable latch thereon adapted for engagement with said latch dog, securing members secured to said cleaning door, securing members to said frame and adapted for mating with said cleaning door securing members when said cleaning door is in closed position, and releasable retaining members for clamping said cleaning door securing members and frame securing members together for retaining said cleaning door in closed position whereby said cleaning door may be easily opened for exposing concave bars for cleaning and yet said cleaning door will not interfere with the operation of said safety door during combine operation.

4. In a combine harvester having a mobile frame including side walls and a bottom wall and a threshing cylinder rotatably supported between said side walls and above said bottom wall and a plurality of circumferentially spaced concave bars secured to the upper side of said bottom wall facing said cylinder and normally positioned adjacent to and longitudinally of said cylinder, the improvement comprising, a safety door and a cleaning door forming portions of said bottom wall, said safety door having a front edge and a rear edge, said safety door front edge being hingedly secured to a portion of said bottom wall forwardly of said cylinder for pivotal movement downwardly and forwardly of said cylinder, said safety door rear edge having a latch dog secured thereon, said cleaning door being of concave shape and having a front edge and a rear edge and integral planar upwardly extending end portions, said cleaning door forming a substantially hollow cylindrical segment container with closed ends for retaining grain therein, said cleaning door supporting a majority of said concave bars and the rear edge thereof being hingedly secured to a portion of said bottom wall rearwardly of said cylinder, said cleaning door front edge having a pressure-releasable latch thereon adapted for engagement with said latch dog, angle members secured to the under side of said cleaning door and extending horizontally outwardly of said end portions, a channel member secured to each of said side walls adjacent said cylinder and extending downwardly in overlapping relation to said end portions and a leg on each of said channel members mating with said angle members when said cleaning door is in closed position, and releasable retaining members for clamping said angle members to said channel member legs for retaining said cleaning door in closed position whereby said cleaning door may be easily opened for exposing concave bars for cleaning and yet said cleaning door will not interfere with the operation of said safety door during combine operation.

References Cited in the file of this patent
UNITED STATES PATENTS

| | | |
|---|---|---|
| 753,032 | Bankey | Feb. 23, 1904 |
| 2,616,433 | Anderson | Nov. 4, 1952 |
| 2,959,175 | Oberholtz et al. | Nov. 8, 1960 |

FOREIGN PATENTS

| | | |
|---|---|---|
| 807,324 | Great Britain | Jan. 14, 1959 |